Patented Jan. 9, 1951

2,537,840

UNITED STATES PATENT OFFICE 2,537,840

GUANYLMELAMINES AND METHOD OF PREPARING

Alexander F. MacLean, Calallen, Tex., assignor to American Cyanamid Company, New York, N. Y., a corporation of Maine No Drawing. Application July 7, 1949, Serial No. 103,521

5 Claims. (Cl. 260—249.6)

The present invention relates to the preparation of guanylmelamines and acid salts thereof, and more particularly to the preparation of mono-, di- and triguanylmelamines and acid addition salts thereof.

The object of the present invention is to prepare said guanylmelamines and salts in good yield and at low cost by a process employing cheap reactants and simple apparatus and procedures.

Other objects of the present invention will be made apparent by the discussion that follows hereinafter.

It has now been found that guanylmelamines, namely, the mono-, di- and triguanylmelamines, may be prepared by treating dicyandiamide with a substantially anhydrous hydrogen halide such as HCl, HBr, HF, and the like. Such treatment may be carried out in any suitable manner, as, for example, by treating the solid dicyandiamide with the hydrogen halide directly or by carrying out the treatment after first putting dicyandiamide into a solvent and/or diluent. Also, in addition to treating the dicyandiamide with the hydrogen halide the process of the invention may be effected by making certain dicyandiamide hydrogen halide complexes or salts and heating such materials to a temperature suitable for the reaction. Similarly, a solution or suspension of dicyandiamide may be treated with the hydrogen halide at low temperatures to, say, substantially saturate the liquid medium with said halide and/or react with the dicyandiamide to form products intermediate in the overall reaction and thereafter this mixture may be heated to a temperature sufficient for formation of the guanylmelamines to occur.

The process of the present invention may be carried out over a rather wide range of temperatures, depending on the hydrogen halide used. With hydrogen chloride a temperature within the range of 55°–180° C. is suitable, the preferred range being 100°–150° C. While temperatures above 180° C. may be employed with hydrogen chloride such high temperatures will frequently result in the formation of an excess amount of by-products such as melamine and the like. At temperatures below 55° C. with hydrogen chloride the reaction proceeds at a rate too low for practical purposes. When using hydrogen fluoride, however, considerably lower temperatures may be employed.

As indicated hereinabove, any one of a large number of solvents and/or diluents may be employed as reaction media for carrying out the present process, although, obviously, the use of water is to be avoided. Not only should water be avoided but any of the liquid media employed should be substantially anhydrous. Such liquid media as may be employed are the phenols, the esters, the aromatic, aliphatic, and alicyclic hydrocarbons, the ketones, the sulfolanes and the like.

The following examples show typical methods for the preparation of the guanylmelamines of the present invention.

By the process of this invention, mixtures of free mono-, di- and triguanylmelamine bases and/or their acid addition salts, as well as the individual bases or salts, may be prepared substantially free from dicyandiamide and other contaminants.

EXAMPLE 1

A mixture containing 84 g. of dicyandiamide and 550 g. of phenol was heated to melt the phenol and dissolve the dicyandiamide, and, at 100° C., anhydrous HCl was bubbled through the reaction mixture. Said HCl addition was continued until about 39 g. of the gas had been added. Thereafter, the mixture was heated for 15 minutes at 150° C., cooled again to 100° C. and the mixture of phenol insoluble guanylmelamines was filtered. The filtrand was washed with sufficient phenol to remove most of the phenol soluble material therefrom and then with methyl ethyl ketone to remove the phenol. After drying for 24 hours at 60° C., the mixed guanylmelamine hydrochlorides weighed 117 g.

EXAMPLE 2

A mixture of 84 g. of dicyandiamide and 300 g. of phenol was heated to melt the phenol and dissolve the dicyandiamide, and, at 120° C., the addition of anhydrous HCl was begun. The addition of 35 g. of the acid required 15 minutes. Thereafter, the reaction mixture was cooled to 40° C., diluted with several times its volume of methyl ethyl ketone, the resultant precipitate filtered, washed with methyl ethyl ketone, and after drying at 60° C. for about a day weighed 116 g. From this, 30.6 g. of monoguanylmelamine, 15.1 g. of diguanylmelamine and 5.8 g. of triguanylmelamine were obtained.

The mixed guanylmelamines of the above examples and those that follow were separated to obtain the relatively pure mono-, di- and triguanylmelamine in accordance with the following procedure: 50 g. of the mixed guanylmelamine hydrohalides were dissolved in 300 g. of boiling water and the pH adjusted to 7.0 by the addition of 28% ammonium hydroxide. In most cases a gelatinous precipitate is formed at this stage and neutralizing the solution slowly at about 70°–80° C. provided a more filterable precipitate. The solution was filtered while hot and the filtrand washed with 100 cc. of hot water. The combined filtrate and wash water were heated to 90° C. and 10 g. of cupric chloride dihydrate was added. After solution of the copper salt 50 cc. of 28% ammonium hydroxide was added slowly and with stirring. This resulted in the formation of a red colored precipitate which was filtered and washed with 100 cc. of hot water containing 10 cc. of 28% ammonium hydroxide. The precipitate was a copper diguanylmelamine complex. The copper complex of the triguanyl- and monoguanylmelamines were soluble in the hot ammoniacal solution.

The red copper diguanylmelamine complex was broken up in 50 cc. of water and 51% sulfuric acid was added slowly until the pH was down to 2–4. This resulted in the precipitation of diguanylmelamine sulfate. To further said precipitation, 20 g. of ammonium acid sulfate were added. The mixture was cooled to 20° C., the diguanylmelamine sulfate filtered and dried at 150° C.

The filtrate containing the soluble copper mono- and triguanylmelamine complexes was heated to 90° C. and 20% sulfuric acid was added until the pH was 2–4. Thereafter, 20 g. of ammonium acid sulfate was added and the solution was maintained at 10° C. for several hours to insure an almost quantitative precipitation of the sulfates of the mono- and triguanylmelamines. Said sulfates were then filtered and reslurried in a sufficient amount of water to make the sulfates dissolve upon the addition of 10% sodium hydroxide at 70° C. The solution was then cooled to 40° C. whereupon the triguanylmelamine trihydrate crystallized from solution. After holding the solution at 40° C. for an additional hour said triguanylmelamine trihydrate was filtered, washed with water and then with acetone and thereafter dried for one hour at 60° C.

The mother liquor from the triguanylmelamine trihydrate separation was then heated to 80°–90° C. and 20% sulfuric acid was added until the pH was 2–4. As before, 20 g. of ammonium acid sulfate was added and after maintaining the solution at 20°–30° C. for about 3 hours the monoguanylmelamine sulfate had completely precipitated. It was filtered, washed with water and dried at 100° C.

Other preparations have been carried out using widely varying temperatures for the hydrogen chloride addition, temperatures as low as 55° C. and as high as 180° C. being employed satisfactorily. However, somewhat better results are obtained if the hydrogen chloride addition is carried out at the lower temperatures and the reaction mixture is heated to a relatively higher temperature, one of the order of 100°–150° C. being used to obtain the best results.

EXAMPLE 3

A mixture of 42 g. or 0.5 mol of dicyandiamide and 200 g. of phenol was heated to melt the phenol and thereafter the addition of 26 g. of gaseous HBr was effected at 40° C. By the end of the time required for such addition, only a small amount of material had precipitated out of the phenol to evidence the formation of any guanylmelamine. Thereafter, the phenol solution was diluted with several times its volume of methyl ethyl ketone to precipitate the phenol soluble materials which amounted to 57 g. This material was redissolved in about 200 g. of phenol and heated for 10 minutes at 150° C. After even this short period of reaction about 10 g. of phenol insoluble material was obtained. Of the crude guanylmelamine hydrobromides about 6.5 g. were monoguanylmelamine, 3 g. were diguanylmelamine, and 0.5 g. was triguanylmelamine hydrobromide.

EXAMPLE 4

A. Dicyandiamide dihydrochloride was prepared by mixing 0.1 mol of dicyandiamide with 0.2 mol of 37% aqueous HCl, cooling to 5° C. and thereafter adding an additional 0.2 mol of the acid. This preparation required about 10 minutes at the end of which a dense crystalline precipitate of dicyandiamide dihydrochloride was obtained. The precipitate was filtered, washed with methyl ethyl ketone, and after drying for 10 minutes at 40° C. in a vacuum weighed 10.1 g., thus amounting to 0.07 mol of the dicyandiamide dihydrochloride.

A mixture of 157 g. of dicyandiamide dihydrochloride and 250 g. of phenol was heated to 60° C. to effect fusion and solution and thereafter warmed to 100°–125° C. for a period of 25 minutes. After this a precipitate of phenol insoluble material was recovered by filtration, the filtrand was washed with phenol followed by methyl ethyl ketone and after air-drying the mixed guanylmelamine hydrochlorides amounted to 71 g.

B. A mixture of 100 g. of dicyandiamide dihydrochloride, 60 g. of dicyandiamide and 400 g. of phenol was heated at 45° C. and thereafter warmed to 120° C. which temperature was maintained for an additional 15 minutes. A precipitate of phenol insoluble material was obtained by filtration, washed with phenol and thereafter with methyl ethyl ketone and after being air-dried amounted to 149 g. of the mixed mono-, di- and triguanylmelamine hydrochlorides.

C. A mixture of 80 g. of dicyandiamide dihydrochloride, 42 g. of dicyandiamide and 200 g. of phenol was heated for 15 minutes at 100°–110° C. The solution of phenol was diluted with several times its volume of methyl ethyl ketone which resulted in the separation of 120 g. of phenol soluble and phenol insoluble material. Using the method of separation described hereinabove showed the same to contain 42.2 g. of monoguanylmelamine, 17.2 g. of diguanylmelamine, and 2.8 g. of triguanylmelamine.

EXAMPLE 5

Dicyandiamide monohydrochloride was prepared by admixing 15.7 g. or 0.1 mol of dicyandiamide dihydrochloride with 8.4 g. or 0.1 mol of dicyandiamide in a sufficient amount of acetic acid to effect solution at substantially room temperature. After stirring for one hour the dicyandiamide monohydrochloride was filtered off, washed several times with methyl ethyl ketone and thereafter dried for 10 minutes at 50° C. under vacuum. 22.0 g. or 0.18 mol of said monohydrochloride was thus obtained.

A mixture of 100 g. or 0.83 mol of dicyandiamide monohydrochloride and 300 g. of phenol was heated for 15 minutes at 70° C.–115° C., the mixture was cooled somewhat and filtered to obtain the mixed guanylmelamines as the filtrand which was then washed with methyl ethyl ketone and air-dried.

In a similar experiment 62 g. of 0.52 mol of dicyandiamide hydrochloride was heated with 94 g. of phenol for a longer period of time over the temperature range of 50°–180° C. to obtain the mixed guanylmelamine hydrochlorides as a phenol-insoluble precipitate.

EXAMPLE 6

Tetracyanamide acetone dihydrochloride was prepared by mixing at room temperature 42 g. or 0.5 mol of dicyandiamide, 160 g. or 2.8 mol of acetone and 59 g. or 0.6 mol of 37% HCl and stirring for about 2 hours. The reactants initially went completely into solution and thereafter a crystalline solid precipitated. The crystalline solid, which was tetracyanamide acetone hydrochloride, was filtered and washed with acetone and after air-drying overnight the tetracyanamide acetone hydrochloride weighed 55 g. or 0.366 mol providing a yield of 73% of theory.

150 g. of tetracyanamide acetone dihydrochloride was added over a 15 minute period to 200 g. of phenol maintained at 95°–100° C. After the addition had been completed, the temperature rose to 115° C. and thereafter fell. The reaction mixture was then diluted with 1000 cc. of acetone, filtered, the filtrand washed with acetone and dried to obtain 113 g. of the mixed guanylmelamine hydrochlorides. From this material 29.6 g. of the monoguanylmelamine, 20.7 of the diguanylmelamine and 4.5 g. of the triguanylmelamine were isolated.

EXAMPLE 7

A mixture of 1000 cc. of toluene, and 100 g. of dry, 100-mesh dicyandiamide was treated on a steam bath by bubbling in a stream of anhydrous gaseous HCl at a low rate. At the end of 9¼ hours the HCl was no longer taken up and the reaction mixture was cooled to room temperature. The solid reaction product was filtered from toluene and dried in an oven at 95° C. for a period of about 24 hours. The mixed guanylmelamine hydrochlorides weighed 129.5 g.

EXAMPLE 8

20 g. of pelleted dicyandiamide were placed in a reaction tube and heated to 100° C. Anhydrous hydrogen chloride was passed slowly over the dicyandiamide for 7½ hours, avoiding fusion, at the end of which time no more hydrogen chloride was taken up by the solid. It was found that unless the addition of HCl was made slowly, the pellets fused superficially and the reaction was inhibited. The weight of the mixed mono-, di- and triguanylmelamine hydrochlorides solid was 25 g.

Preparation of free guanylmelamine bases

The monoguanylmelamine was prepared by neutralizing the sulfate thereof in water with the addition of 28% ammonium hydroxide to a pH 7. For 192 g. of said sulfate in 250 cc. of water, 38 cc. of such ammonium hydroxide was required for neutralization. This resulted in obtaining 158 g. of di-(monoguanylmelamine) sulfate which was then heated in 250 cc. of water, a sufficient amount of 20% sodium hydroxide being added to effect solution. Said solution was then cooled at 20° C. and crystals of monoguanylmelamine trihydrate precipitated. These were filtered, washed with about 60 cc. of ice water and then slurried in 300 cc. of acetone. The acetone suspension was then filtered and the solid monoguanylmelamine trihydrate was dried for 4 hours at 110° C. During such drying the monoguanylmelamine trihydrate was converted to anhydrous monoguanylmelamine; 70 g. of the anhydrous product were thus obtained. The yield of monoguanylmelamine based on total monoguanylmelamine sulfate was 55%. This yield was increased to 76% by treating the filtrate from the monoguanylmelamine trihydrate separation with 20% sulfuric acid to a pH of 2 which permitted the recovery of 46 g. of monoguanylmelamine sulfate.

As is evident from the above, the monoguanylmelamine is very soluble in hot water and on crystallizing from a cool solution comes out as the trihydrate, said trihydrate being readily converted to the anhydrous free base by drying at, say, 110° C. The said monoguanylmelamine melts at 240°–241° C. The picrate of the same which was prepared by dissolving the free base in hot water, adding hot aqueous picric acid, cooling to provide crystallization and filtering the picrate, melts at 260°–261° C. (uncorr.) when said picrate contains 2 mols of picric acid per mol of guanylmelamine and at 292°–293° C. (uncorr.) when the molar ratio of combination is 1:1.

The preparation of the free diguanylmelamine from the sulfate thereof was effected by slurrying 29 g. of said sulfate in 100 cc. of water and adding a sufficient amount of 20% sodium hydroxide until solution was effected at 90° C. The hot solution was cooled and after about 4 hours at 10° C. dense needles were formed. These were filtered, washed with ice water and acetone, and dried for 1 hour at 100° C. to obtain 17 g. of the crystalline diguanylmelamine dihydrate in a yield of 78% of theory. This compound is moderately soluble in hot water crystallizing from cold water rather readily. The 2 mols of water of hydration may be removed by heating to 150° C. under vacuum. The compound decomposes over a wide range without melting. Its picrate prepared substantially as the monoguanylmelamine picrate melts at 297°–298° C. (uncorr.).

As indicated above, the triguanylmelamine trihydrate is sparingly soluble in boiling water, being practically completely insoluble in cold water. Said trihydrate is obtained in the form of long, easily filtered needles, which lose water readily above 100° C. to convert to the anhydrous base. The triguanylmelamine picrate, prepared in a manner similar to that employed above for preparing the picrate of the monoguanylmelamine melts at 303°–304° C. (uncorr.).

Monoguanylmelamine trihydrate was prepared by dissolving 4.0 g. of the anhydrous monoguanylmelamine in 20 cc. of water by heating to 70° C., cooling said solution and letting it stand for 2 hours in ice water. The solution was thereafter diluted with 75 cc. of acetone which resulted in the formation of the precipitate of monoguanylmelamine trihydrate which after being washed with acetone and dried for 10 minutes at 65° C. under vacuum weighed 4.0 g.

Monoguanylmelamine monohydrochloride monohydrate was prepared by neutralizing an aqueous solution of monoguanylmelamine with dilute hydrochloric acid to a pH of 7. This results in the formation of a crystalline precipitate of monoguanylmelamine monohydrochloride monohydrate on cooling the solution.

The neutralization of triguanylmelamine trihydrate with dilute hydrochloric acid to a pH of 2 resulted in the formation of a dense, easily filtered solid. This precipitate was the triguanylmelamine trihydrochloride dihydrate which was filtered, washed with acetone and dried at 65° C.

The neutralization of 4.0 g. of triguanylmelamine trihydrate in water with 26 cc. of 0.5 N hydrochloric acid resulted in the precipitation of the triguanylmelamine monohydrochloride which was filtered, washed with acetone and dried for one hour at 130° C. under vacuum.

Other salts of the guanylmelamines were prepared by reacting the aqueous solutions of the guanylmelamine hydrochlorides with the corresponding ammonium salts. In this manner the phosphates, pyrophosphates, nitrates, and carbonates of the guanylmelamines were prepared, all being substantially insoluble in water. Also, the free monoguanylmelamine when treated with aqueous cyanamide provides an insoluble cyanamide salt.

A reaction analogous to that of Example 8 has been reported in the literature by Haag, Annalen, vol. 122, p. 28 (1862). In his experiment Haag conducted dry hydrogen chloride over dry dicyandiamide at 100° C. and reported that the dicyandiamide partly fused. Haag was attempting to make a dicyandiamide hydrochloride, but stated there was no hydrogen chloride absorption in a quantity to indicate the formation of the desired salt. It is not known whether he obtained any guanylmelamines and he does not so state. If present, they were not isolated.

In the only other known recorded instance of reacting dicyandiamide with hydrogen chloride in the 55°–180° C. temperature range (Pranke, Cyanamide, p.18, published by William and Norgate, 1913), the materials were heated at 150° C. to give guanidine hydrochloride. In attempting to repeat this work it was found that the reaction, which is highly exothermic, could not be controlled at 150° C. It is therefore reasonably certain that Pranke did not mean dry HCl but aqueous HCl, which is known to give guanidine hydrochloride when reacted with dicyandiamide under such conditions.

For some purposes, such as flame-proofing preparations, the monoguanylmelamine is the preferred base. The monoguanylmelamine may be prepared in excellent yield, accompanied by only small amounts of the di- and triguanylmelamines, by conducting the reaction of dicyandiamide and hydrogen chloride in a solvent selected from the group consisting of hydrocarbon-tertiary amine solutions and nitrohydrocarbon-tertiary amine solutions. According to this method, the preferred temperature range is relatively narrow, being 90°–125° C., and it is preferred to maintain the weight proportion of dicyandiamide:solvent at about 1:4. The following series of examples illustrate this method of preparing a guanylmelamine mixture which is predominantly monoguanylmelamine.

EXAMPLE 9

In a 3-neck flask is poured 400 g. of a mixture consisting of 40% pyridine and 60% nitrobenzene. The flask is equipped with a stirrer, a thermometer, and an entrance tube for the continuous addition of dry hydrogen chloride. The solution is warmed to a temperature of 90° C. and the addition of hydrogen chloride is begun. When the addition is complete, as evidenced by the reaction of hydrogen chloride vapors leaving the flask through an exit tube and passing same over a beaker partly filled with aqueous ammonia, whereby a fog of ammonium chloride is formed, the temperature is adjusted to 110° C. and several grams of dicyandiamide are added. The reaction is exothermic and the flame may be withdrawn. When the conversion is complete, as evidenced by renewed egress of hydrogen chloride, additional amounts of dicyandiamide are added. This procedure is repeated until 100 g. of dicyandiamide have been added over a period of 2 hours. During this time the addition of hydrogen chloride has been continuous and the temperature has been maintained at 110° C. After all the dicyandiamide has been added, the addition of hydrogen chloride is continued for about 15 minutes.

The monoguanylmelamine trihydrochloride contained in suspension is worked up as follows. The reaction mass is cooled at 50° C. and solids recovered by filtration. The solids are dissolved in water in the ratio of 100 g. to 500 cc. of water (at 90°–100° C.). Since the monohydrochloride is the derivative generally desired, it is necessary to raise the pH of the solution to release all but one of the hydrogen chloride molecules from the compound. This is conveniently done by adding aqueous ammonia until the pH is within the range 5–7. A small amount of insoluble material generally precipitates at this point, and if so, a filter aid such as filter cel (diatomite) should be added and the solution filtered hot. The filtrate is permitted to cool slowly to room temperature which will require 2–5 hours. This extended period permits crystal growth and facilitates subsequent filtration. The yield may be further increased by chilling the solution to 5° C. and filtering. The filter cake is wet monoguanylmelamine monohydrochloride, monohydrate. It may be obtained dry by placing the filter cake in the oven at 100° C. for about 3 hours. The material is virtually free of di- and triguanylmelamines, as the hydrochlorides of these materials which are present in low concentration remain in solution at a pH within the range of 5–7.

The following table shows the effect of varying the ratio of solvent components on the conversion of dicyandiamide to a product consisting almost entirely of monoguanylmelamine. The conversion and yield figures are based on monoguanylmelamine base, although the material as recovered is monoguanylmelamine monohydrochloride, monohydrate.

TABLE I

| Exp. No. | Solvent Composition, Weight Per Cent | | Dicyandiamide to Monoguanylmelamine (including small amounts of di- and triguanylmelamines) Mol Per Cent | |
|---|---|---|---|---|
| | Pyridine | PhNO$_2$ | Conversion | Yield |
| 42A | 5 | 95 | 62.1 | 58.4 |
| 42C | 20 | 80 | 78.6 | 71.7 |
| 42B | 30 | 70 | 87.6 | 78.8 |
| 44A | 40 | 60 | 89.5 | 80.0 |
| 44C | 50 | 50 | 85.7 | 75.9 |
| 44B [1] | 50 | 50 | 88.5 | 79.0 |

[1] No more HCl added after initial solvent saturated with HCl.

EXAMPLE 10

Under conditions analogous to those of Example 9, a solvent mixture consisting of 40% pyridine and 60% diethylbenzene was used, with a 72.3% conversion of dicyandiamide to monoguanylmelamine, (including small amounts of di- and triguanylmelamines), with a total yield of 66.4%.

EXAMPLE 11

Under conditions similar to those of Example 9, a solvent consisting of 40% pyridine and 60% kerosene was used, with a 93.8% conversion of dicyandiamide to monoguanylmelamine, and a total yield of 88.3% of monoguanylmelamine (including small amounts of di- and triguanylmelamines). Instead of kerosene, a deodorized kerosene sold under the tradename "Deobase" may be used. Deodorized kerosene is simply kerosene with mercaptans, sulfides, and other odorous components removed.

EXAMPLE 12

Under conditions analogous to those of Example 9, a solvent mixture consisting of 40% tri normal butylamine and 60% nitrobenzene was used, with a 55% conversion of dicyandiamide to monoguanylmelamine, and a 50% yield of monoguanylmelamine (including small amounts of di- and triguanylmelamines).

EXAMPLE 13

Under conditions similar to those of the preceding examples, a solvent consisting of 40% dimethylaniline and 60% nitrobenzene was used, with a 79.2% conversion of dicyandiamide to monoguanylmelamine, and a yield of 72.3% monoguanylmelamine (including small amounts of di- and triguanylmelamines).

EXAMPLE 14

It is a preferred embodiment of the invention to recycle the solvent. For example, when using a 40/60 mixture of pyridine and nitrobenzene, the use of the recycled solvent results in an increased conversion of dicyandiamide to monoguanylmelamine amounting to about 10%.

EXAMPLE 15

When a 50/50 mixture of dimethylaniline and nitrobenzene is recycled as in the preceding example, the average conversion of dicyandiamide to monoguanylmelamine is increased about 9%.

While it is preferred to use solvents and solvent mixtures that are liquids at room temperature, and also at the temperature of the conversion (preferably not higher than 125° C.), the low boiling solvents, such as the low molecular weight hydrocarbons and nitroparaffins, may be used by conducting the reaction in an autoclave. A condition of such modification is that the critical temperature of the solvent mixture must exceed the operating temperature, in order to maintain a liquid condition within the autoclave.

As examples of the hydrocarbons suitable for use with tertiary amines in the conversion of dicyandiamide to monoguanylmelamine, the following are cited: toluene, xylene, ethyl benzene, diethyl benzene, kerosene, hexane (with pressure), decane.

As examples of the tertiary amines suitable for use in this reaction in combination with any of the hydrocarbons or nitrohydrocarbons listed herein, the following are examples: trimethylamine, triethylamine, tributylamine, tripropylamine, triamylamine, dimethylaniline, diethylaniline, pyridine, lutidine, collidine, quinoline, isoquinoline.

As examples of nitrohydrocarbons suitable for use in mixture with any of the tertiary amines above listed, the following are illustrative: nitrobenzene, nitrotoluene (any), nitroxylene (any), nitroethylbenzene (any).

Excellent yields of monoguanylmelamine, nearly free of diguanyl- and triguanylmelamines, may also be obtained by conducting the reaction of dicyandiamide and hydrogen chloride in a solvent consisting of cyclotetramethylene sulfone, (also known as sulfolane), or solutions of sulfolane or its methyl and ethyl derivatives in a nitrohydrocarbon, as shown in the two following examples. The yields stated in the examples include small amounts of di- and triguanylmelamines.

EXAMPLE 16

In a 3-neck flask is poured 400 g. of sulfolane (cyclotetramethylene sulfone). The flask is equipped with a stirrer, a thermometer, and an entrance tube for the continuous addition of dry hydrogen chloride. The solution is warmed to a temperature of 110° C. and the addition of hydrogen chloride is begun. When the addition is complete (as evidenced by the reaction of hydrogen chloride vapors leaving the flask through an exit tube and passing same over a beaker partly filled with aqueous ammonia, whereby a fog of ammonium chloride is formed), several grams of dicyandiamide are added. The reaction is exothermic and the heat may be withdrawn. When the conversion is complete, as evidenced by renewed egress of hydrogen chloride, additional amounts of dicyandiamide are added. This procedure is repeated until 100 g. of dicyandiamide have been added over a period of 2 hours. During this time the addition of hydrogen chloride has been continuous. After all the dicyandiamide has been added, the addition of hydrogen chloride is continued for about 15 minutes. The result is a suspension of monoguanylmelamine trihydrochloride.

The suspended crude monoguanylmelamine trihydrochloride is worked up as in Example 9.

When following the procedure as outlined above, the conversion of dicyandiamide calculated as monoguanylmelamine is 86.5%, with an overall yield of 77.5%.

EXAMPLE 17

Under conditions analogous to those of Example 16, a solvent mixture consisting of 50 parts of sulfolane and 50 parts of nitrobenzene was used, with a conversion of 78.6% and a total yield of 72.5%.

While it is preferred to use solvent mixtures that are liquids at room temperature, and also at the temperature of conversion (preferably not higher than 125° C.), a considerable amount of a low boiling nitrohydrocarbon, such as a low molecular weight nitroparaffin, may be mixed with the sulfolane if the reaction is conducted in an autoclave. A condition of such modification is that the critical temperature of the solvent mixture must exceed the operating temperature, in order to maintain a liquid medium within the autoclave.

As examples of aromatic nitrohydrocarbons suitable for use with sulfolane and its methyl and ethyl derivatives, the following are cited: nitrobenzene, nitrotoluene (any), nitroxylene (any), nitroethylbenzene (any). They are particularly suitable for use with dimethylsulfolane.

It is a preferred embodiment of the invention to recycle the solvent or solvent mixture after the guanylmelamine salt is separated therefrom.

Preparation of guanylmelamines using HF

As above stated, when using hydrogen fluoride a lower temperature range is preferred than when using HCl. While the reaction may be conducted in liquid HF at very low temperatures, it is impracticably slow below −10° C. It is preferred to react the materials at a temperature of at least 0°–5° C. Below 25° C., with a large excess of hydrogen fluoride as the solvent and catalyst, a product is obtained which analyzes about 90% diguanylmelamine, the remaining being a 10% mixture of mono- and triguanylmelamines. At higher temperatures a mixture of guanylmelamines is obtained in which diguanylmelamine does not necessarily predominate.

While the reaction may be conducted in its entirety at room temperature, the exothermic reaction which takes place on the addition of dicyandiamide to liquid hydrogen fluoride is very difficult to control at room temperature. It is preferred, therefore, to mix the reactants at a low temperature, preferably 0°–5° C. In one experiment, for example, 58 g. of dicyandiamide were added to liquid hydrogen fluoride in an open vessel maintained at 0°–5° C. The reaction mass was kept at this temperature for one hour and then heated for 1½ hours at 90° C. The product was allowed to solidify and was then dissolved in water. Only a small amount of material failed to go into solution and this was removed by filtration. The filtrate was neutralized to a pH of 7 with ammonium hydroxide to precipitate additional insoluble material, which was then filtered, leaving the hydrofluorides of the mono-, di- and triguanylmelamines in solution. Evaporation gave the mixed solid hydrofluorides.

Like the hydrochlorides, the hydrofluorides may be used as a mixture, or may be separated. The separation procedure is the same as for the mixed hydrochlorides.

While the reaction with HF can be carried out in an open vessel such as a beaker, it is preferred to use a reflux system resistant to hydrogen fluoride. In the following examples the reaction vessel used was a copper cylinder, arbitrarily 3″ in diameter and 6″ high. A threaded brass cap sealed the reactor by means of a lead gasket and was fitted with a hole for a stirrer shaft and two holes tapped to accommodate three-eighths inch pipe fittings. A water-cooled copper reflux condenser was attached to one hole while the other was used as a port for the addition of dicyandiamide when not closed with a brass plug. A two bladed motor driven copper stirrer was used for agitation.

In carrying out the reaction of dicyandiamide in liquid hydrogen fluoride at temperatures in excess of 25° C. the following procedure was used. Anhydrous hydrogen fluoride was distilled from a cylinder into a cooled copper weighing bottle of 220 g. capacity and was then poured as a liquid into the reactor cooled in ice. Dicyandiamide was added to the cooled, stirred hydrogen fluoride in small portions. The reaction was exothermic and was accompanied by sputtering similar to that of water being added to concentrated sulfuric acid. When the addition was complete, the reactor was heated cautiously to 90° C. for a period of time as indicated in the following table. The excess hydrogen fluoride was then distilled from the reaction vessel by removing the reflux condenser and passing in a stream of nitrogen while heating the reactor in a steam bath.

Three runs using this procedure are summarized in Table II following.

TABLE II

*The reaction of dicyandiamide and hydrogen fluoride at elevated temperatures*

| Exp. No. | Reactants | Moles | Grams | Reaction Conditions | Discussion |
|---|---|---|---|---|---|
| D-1-2 | HF<br>Dicyandiamide | 8.0<br>1.35 | 160<br>113 | Addition at 5° C. Spontaneous rise to 75° C. Heat at 90° C. until dry. | Crude mixed hydrofluorides weighed 202 g. |
| D-3-1 | HF<br>Dicyandiamide | 10.0<br>1.25 | 200<br>105 | Addition at 5° C. Spontaneous rise to 45° C. 8 hrs. at 90° C. | Weight of crude mixed hydrofluorides, 110 g. |
| D-3-2 | HF<br>Dicyandiamide | 8.0<br>1.4 | 160<br>117 | Addition at 5° C. Maintain at 5° C. for 16 hrs. Heat at 90° C. for 6 hrs. | Crude mixed hydrofluorides weighed 230 g. |

While excellent yields are obtainable by the above procedures, it is preferred to keep the temperature at 25° C. or below. It has been found that the use of lower temperatures provides even greater yields of mixed guanylmelamines and especially of diguanylmelamine. In carrying out the low temperature method of reaction, the following procedure is conveniently used.

The reaction vessel was the same as the copper vessel above described. For the purpose of evacuation of hydrogen fluoride after completing the reaction, it was connected by means of copper tubing and as little rubber as possible to a metal water pump capable of lowering the pressure of the system to about 40 mm.

Dicyandiamide was added to the stirred hydrogen fluoride at about 5° C. and the reactor maintained at ice temperature generally overnight. This extended reaction period at a low temperature prevented a rapid, exothermic reaction from occurring on heating the mixture to room temperature. On completion of the reaction, the excess hydrogen fluoride was removed by evacuating the vessel to about 40 mm. Hg. pressure while maintaining the temperature at about 25° C.

The reaction mixture was dissolved in hot water, filtered and the filtrate neutralized to a pH of 7 with ammonium hydroxide and again filtered. The resulting filtrate heated to about 70° C. was then made strongly basic with concentrated potassium hydroxide solution. The free guanylmelamines produced a thick slurry which after cooling slowly to room temperature was filtered by suction. The wet solid residue was washed with a small amount of cold water, then slurried in acetone and filtered as dry as possible. Oven drying produced a solid cake of the mixed free bases suitable for use in the preparation of flame-proofing materials and the like.

In Table III there are summarized results obtained in various runs using the low temperature method.

TABLE III

*The reaction of dicyandiamide in hydrogen fluoride addition at 5° C., followed by heating to room temperature*

| Run No. | Reagents | Moles | Grams | Max. Temperature | Yield of Crude Mixed Guanylmelamine | |
|---|---|---|---|---|---|---|
| | | | | °C. | Grams | Per Cent of Theory |
| D-6-1 | HF | 8.25 | 165 | 25 | 110 | 87 |
| | Dicyandiamide | 1.5 | 126 | | | |
| D-6-2 | HF | 7.85 | 157 | 25 | 103 | 82 |
| | Dicyandiamide | 1.5 | 126 | | | |
| 3-10 | HF | 8.0 | 160 | 25 | 58 | 46 |
| | Dicyandiamide | 1.5 | 126 | | | |
| 3-11 | HF | 8.4 | 168 | 20 | 62 | 50 |
| | Dicyandiamide | 1.5 | 126 | | | |
| 3-16[1] | HF | 11.2 | 223 | 25 | 127 | 75 |
| | Dicyandiamide | 2.0 | 168 | | | |
| 3-17 | HF | 10.5 | 210 | 23 | 124 | 74 |
| | Dicyandiamide | 2.0 | 168 | | | |

[1] Note: HF removed by blowing with dry air.

The composition of the mixed guanylmelamine hydrofluorides obtained in some of the examples of Table III are broken down in Table IV following into the respective mono-, di- and triguanylmelamines.

TABLE IV

*Analyses of low temperature guanylmelamine mixtures*

| Run No. | Composition of Guanylmelamine Fraction | | | Per Cent Overall Yield of Diguanylmelamine |
|---|---|---|---|---|
| | Mono | Di | Tri | |
| D-6-1 | 7 | 91 | 2 | 66 |
| D-6-2 | 2 | 93 | 5 | 74 |
| 3-11 | 1 | 97 | 2 | 37 |
| 3-17 | 7 | 92 | 1 | 60 |

The mixed guanylmelamine hydrogen fluorides are separated from the reaction mass and from each other by methods analogous to those used in separating the hydrochlorides.

The reaction of hydrogen fluoride and dicyandiamide may be conducted in a mutual solvent, such as dimethyl sulfolane, acetone, methyl isobutyl ketone, and the like. The hydrogen fluoride may be dissolved in the solvent, the solution cooled in an ice bath, followed by the addition of the dicyandiamide, or the dicyandiamide may be dissolved in the solvent, said solution heated, and then a solution of hydrogen fluoride in the same solvent added. In using a solvent with hydrogen fluoride it is preferred to conduct the reaction at a temperature of at least 100° C., since it has been found that below 70° C. little or no guanylmelamine is formed. The mixture of guanylmelamine hydrofluorides contains the monoguanylmelamine as the predominate base when a solvent is employed.

Table V summarizes results obtained using HF with various solvents, temperatures, etc.

TABLE V

*Reaction of dicyandiamide and HF in solvents*

| Run No. | Reagents | Moles | Grams | Solvent | Initial Temp. | Max. Temp. | Remarks |
|---|---|---|---|---|---|---|---|
| | | | | | °C. | °C. | |
| 3-6 | Dicyandiamide | 1.0 | 84 | Dimethyl sulfolane, 150 ml | 8 | 80 | Product contained very little guanylmelamine. |
| | HF | 1.0 | 20 | | | | |
| 3-7 | Dicyandiamide | 1.0 | 84 | Dimethyl sulfolane, 160 ml | 80 | 100 | 60% yield of guanylmelamine, mostly monoguanylmelamine. |
| | HF | 1.15 | 23 | | | | |
| 3-8 | Dicyandiamide | 1.0 | 84 | Acetone, 150 ml | 5 | 70 | Very little guanylmelamine. |
| | HF | 1.0 | 20 | | | | |
| 3-12 | Dicyandiamide | 1.0 | 84 | Methyl isobutyl ketone, 150 ml. | 7 | 100 | 62% yield of guanylmelamine, mostly monoguanylmelamine. |
| | HF | 1.35 | 27 | | | | |
| 3-14 | Dicyandiamide | 1.0 | 84 | ---do--- | 8 | 100 | 90% yield of guanylmelamine, mostly monoguanylmelamine. |
| | HF | 1.4 | 28 | | | | |

Run No. 3-12 in the above table contained a mixture of guanylmelamine hydrofluorides consisting of 71% of the mono-, 9% of the di-, and the balance being triguanylmelamine.

The maximum temperature may of course be higher than 100° C., being governed by the vapor pressure characteristics of the HF-solvent mixture. By the use of high-boiling solvents or by conducting the reaction in an autoclave, temperatures of 150° C. and higher may be employed.

While the invention has been described with particular reference to specific embodiments, it is to be understood that it is not to be limited thereto but is to be construed broadly and restricted solely by the scope of the appended claims.

This case is a continuation-in-part of copending application Serial No. 713,389, now abandoned, filed November 30, 1946.

I claim:

1. The method comprising subjecting dicyandiamide to the action of a dry hydrogen halide to form a guanylmelamine hydrohalide, the reaction being conducted in a solvent, and extracting a guanylmelamine hydrohalide from the reaction mass.

2. The method comprising subjecting dicyandiamide to the action of dry hydrogen chloride in an inert solvent at a temperature within the range 55°–180° C. to form a mixture of guanylmelamine hydrochlorides and extracting the thus-formed mixture from the reaction mass.

3. The method comprising subjecting dicyandiamide to the action of dry hydrogen chloride in a solvent consisting of pyridine and nitrobenzene at a temperature within the range 90°–125° C. to form a mixture of guanylmelamine hydrochlorides in which monoguanylmelamine hydrochloride predominates and separating the thus-formed mixture from the reaction mass.

4. The method comprising subjecting dicyandiamide to the action of dry hydrogen fluoride at a temperature of at least −10° C. to form a mixture of guanylmelamine hydrofluorides, and separating the thus-formed mixture from the reaction mass.

5. The method comprising subjecting dicyandiamide to the action of dry hydrogen fluoride in a solvent comprising methyl isobutyl ketone to form a mixture of guanylmelamine hydrofluorides in which diguanylmelamine hydrofluoride predominates, and separating the thus-formed mixture from the reaction mass.

ALEXANDER F. MacLEAN.

REFERENCES CITED

The following references are of record in the file of this patent:

UNITED STATES PATENTS

| Number | Name | Date |
|---|---|---|
| 2,475,674 | Paden | July 12, 1949 |

OTHER REFERENCES

Haag, Annalen der Chemie and Pharmacie, vol. 122, pp. 27 and 28.

Pranke, "Cyanamid," 1913, page 18, Williams & Norgate (England).